(12) United States Patent
Ohshino et al.

(10) Patent No.: US 8,602,447 B2
(45) Date of Patent: Dec. 10, 2013

(54) AIRBAG DEVICE

(75) Inventors: Masaki Ohshino, Yokohama (JP); Hiroyoshi Shimono, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 88 days.

(21) Appl. No.: 13/131,794

(22) PCT Filed: Oct. 27, 2009

(86) PCT No.: PCT/JP2009/005674
§ 371 (c)(1),
(2), (4) Date: May 27, 2011

(87) PCT Pub. No.: WO2010/064357
PCT Pub. Date: Jun. 10, 2010

(65) Prior Publication Data
US 2011/0227320 A1    Sep. 22, 2011

(30) Foreign Application Priority Data
Dec. 1, 2008   (JP) ................................. 2008-306014

(51) Int. Cl.
*B60R 21/206* (2011.01)
*B60R 21/2334* (2011.01)

(52) U.S. Cl.
USPC ................. 280/730.1; 280/732; 280/743.1; 280/743.2

(58) Field of Classification Search
USPC .................. 280/730.1, 732, 743.1, 743.2
See application file for complete search history.

(56) References Cited

U.S. PATENT DOCUMENTS 8,100,433 B2 * 1/2012 Shimono .................... 280/730.1

FOREIGN PATENT DOCUMENTS

| JP | 11-59310 | 3/1999 |
| JP | 2004-168280 | 6/2004 |
| JP | 2008-162464 | 7/2008 |
| JP | 2008-174210 | 7/2008 |

OTHER PUBLICATIONS

International Search Report for International Application PCT/JP2009/005674, Mailed Nov. 24, 2009, two pages.

* cited by examiner

*Primary Examiner* — Joseph Rocca
*Assistant Examiner* — Laura Freedman
(74) *Attorney, Agent, or Firm* — Brinks Gilson & Lione

(57) ABSTRACT

An airbag device having an airbag that can be inflated and deployed by inflating gas; a gas generator that supplies the inflating gas to the inside of the airbag; a housing that accommodates the airbag in a folded state; and a cloth-like deployment restricting member that is fixed at one end to the housing and that encloses part of the folded airbag. A deployment non-restricted portion of the airbag deploys upward, the deployment non-restricted portion not being enclosed by the deployment restricting member, and a deployment restricted portion, which is enclosed by the deployment restricting member, is deployed afterward.

12 Claims, 9 Drawing Sheets

AIRBAG DEVICE

BACKGROUND

1. Field of the Invention

The present invention relates to an airbag device for installation on a vehicle. In particular, the present invention relates to an airbag device suitable for the so-called knee airbag aimed at protection of occupant's lower leg regions.

2. Related Technology

Vehicles such as automobiles are provided with an airbag system in which a bag is rapidly inflated by gas to prevent the occupants from colliding with dangerous zones, thereby minimizing or preventing injuries or death occurring when the occupant hits a hard part inside the vehicle, such as a steering wheel of front glass, during collision.

When the vehicle collides, the occupant is moved forward by the inertia force and the occupant's knees strike against the instrument panel. In order to protect the occupant from such an impact, an airbag device that inflates from the lower surface of the instrument panel has been suggested.

It is desirable that an airbag device could safely restrain the occupant even in cases with different sitting postures of the occupant (for example, a posture close to the instrument panel). However, according to the invention described in Japanese Patent Application Publication No. 10-315894, when the occupant is abnormally close to the instrument panel, the airbag may cause significant damage to the occupant.

SUMMARY OF THE INVENTION

The present invention has been created with the foregoing in mind, and it is an object thereof to provide an airbag device that can reduce, while having a simple structure, the possible damage to the occupant caused by a deployed airbag.

The airbag device in accordance with the present invention includes: an airbag that protects, by inflation and deployment thereof, lower leg regions of an occupant; a gas generator that supplies an inflating gas to the inside of the airbag; a housing that accommodates the airbag in a folded state; and a cloth-like deployment restricting member that is fixed at one end thereof to the housing and encloses part of the folded airbag. The airbag initially deploys upward from a deployment non-restricted portion, which is not enclosed by the deployment restricting member, with a deployment restricted portion, which is enclosed by the deployment restricting member, being deployed afterward. The non-restricted portion is provided at a position corresponding to the vicinity of the lower portion of the occupant's kneecaps when the airbag has deployed.

According to the present invention having the above-described configuration, the deployment direction and deployment speed of the airbag can be controlled by the deployment restricting member, and potential injury to the occupant by the deployed airbag can be reduced. In particular, in a knee airbag device, a pressure applied close to the occupant's knees can be dispersed by initially deploying the upper portion of the airbag and then deploying, with a delay, the lower portion.

DETAILED DESCRIPTION OF THE INVENTION

Figure 1:
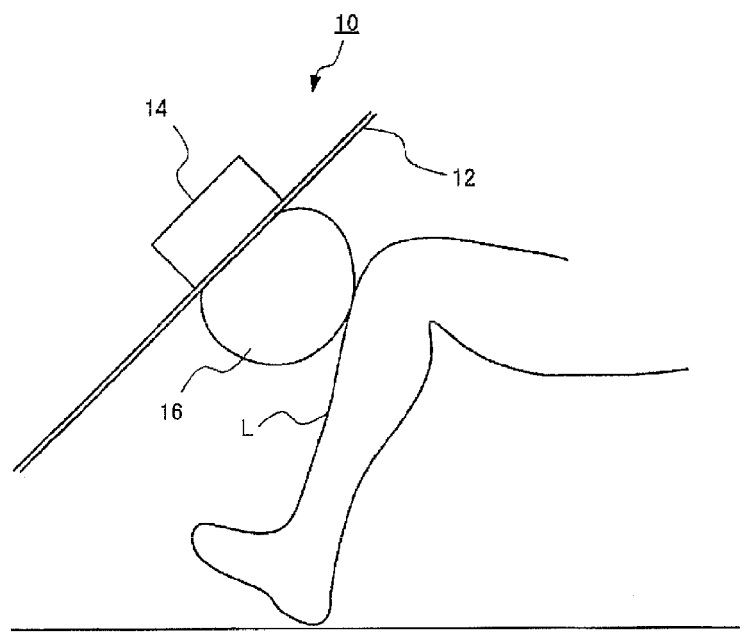
FIG. 1 is an explanatory drawing illustrating the operation of a conventional knee airbag.

FIG. 1 is an explanatory drawing illustrating the operation of the conventional knee airbag. In FIG. 1, an airbag device 10 is accommodated on the inner side of an instrument panel 12. An airbag 16 is accommodated in a folded state inside a housing 14 and configured to inflate and deploy toward the outside when the device is actuated.

In the knee airbag device of such a structure, a large pressure is concentrated in a leg portion "L" (in particular, kneecap portion) of the occupant at the initial stage of deployment of the airbag 16 and, therefore, potential for injury to the occupant is great. This problem is particularly severe in the case in which the occupant gets abnormally close to the instrument panel 12.

Figure 2:
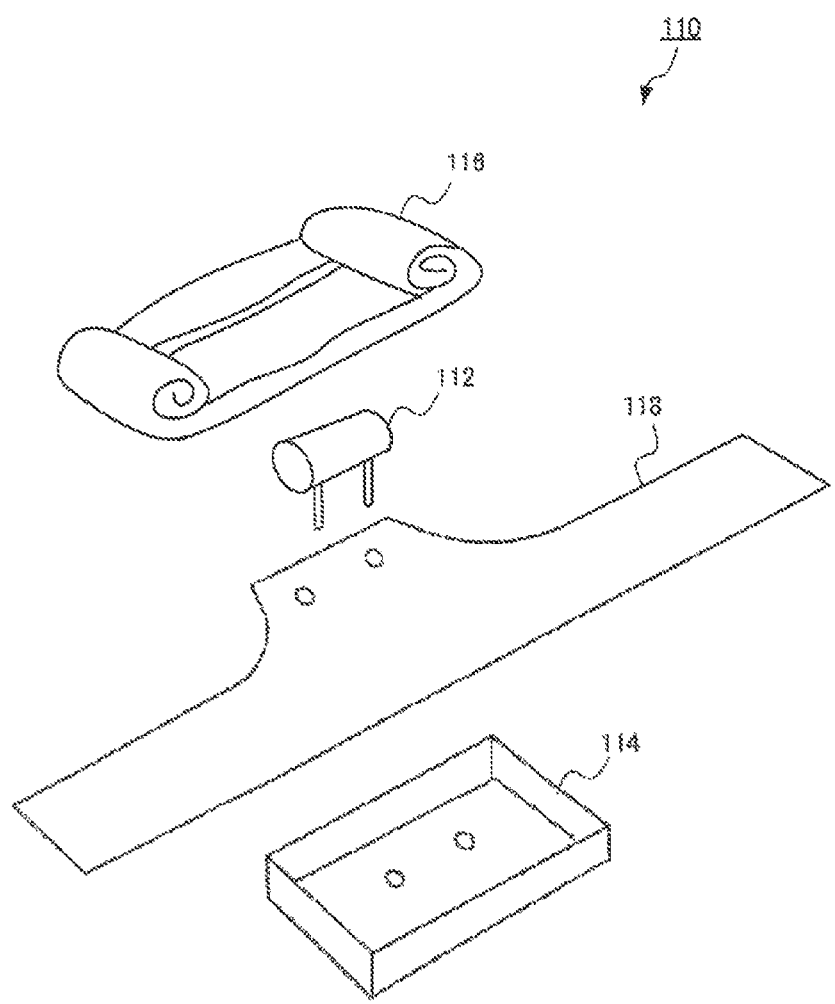
FIG. 2 is an exploded perspective view of a knee airbag device according to a first embodiment of the present invention.

FIG. 2 is an exploded perspective view of a knee airbag device 110 according to a first embodiment of the present invention. FIG. 3(A) is a top view illustrating the structure of the knee airbag device 110 according to the first embodiment. FIG. 3(B) is the cross-sectional view in the A-A direction shown in FIG. 3(A). The knee airbag device 110 according to the present embodiment can be installed, for example, in part of the glove box lid.

The knee airbag device 110 includes an airbag 116 that protects leg regions of the occupant by inflation and deployment when the device is actuated; an inflator 112 that supplies an inflating gas to the airbag 116; a housing 114 that is fixed to the vehicle and accommodates the airbag 116 in a folded state; and a deployment restricting member 118 that restricts the deployment of the airbag 116 inside the housing 114.

The housing 114 is molded in quadrangular box shape and the upper side thereof is open. As described below, the airbag 116 is accommodated inside the housing 114 in a state in which the airbag is folded in the up-down direction and then wound in a roll shape from both the left and right sides toward the center.

The restricting member 118 can be formed, for example, from a material similar to that of the airbag 116. As shown in FIG. 2, the restricting member 118 is shaped in a long thin band and has formed therein two holes for inserting attachment bolts provided at the inflator 112. In the present embodiment, the restricting member 118 is fixed to the housing by the attachment bolts, but the restricting member 118 may be also directly attached by stitching or adhesive bonding to the airbag fixed to the housing.

Figure 3:
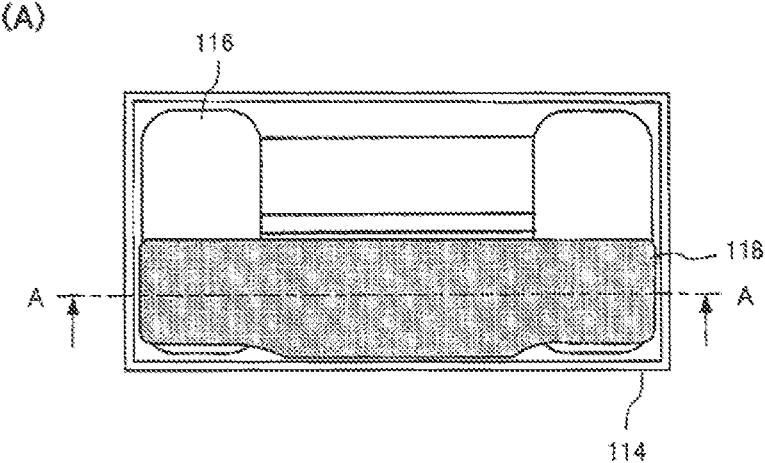
FIG. 3(A) is an elevational view illustrating the structure of the knee airbag device according to the first embodiment.
FIG. 3(B) is the cross-sectional view generally along line A-A shown in FIG. 3(A).
Figure 3:
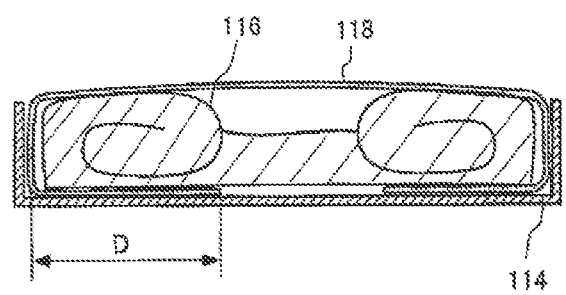

As shown in FIG. 3, the restricting member 118 is configured to enclose a lower portion of the front surface, a lower portion of the side surface, and part of the bottom surface of the folded airbag 116. The restricting member is attached so that the surface shown in FIG. 3(A) faces from the instrument panel toward the inside of the vehicle.

Figure 4:
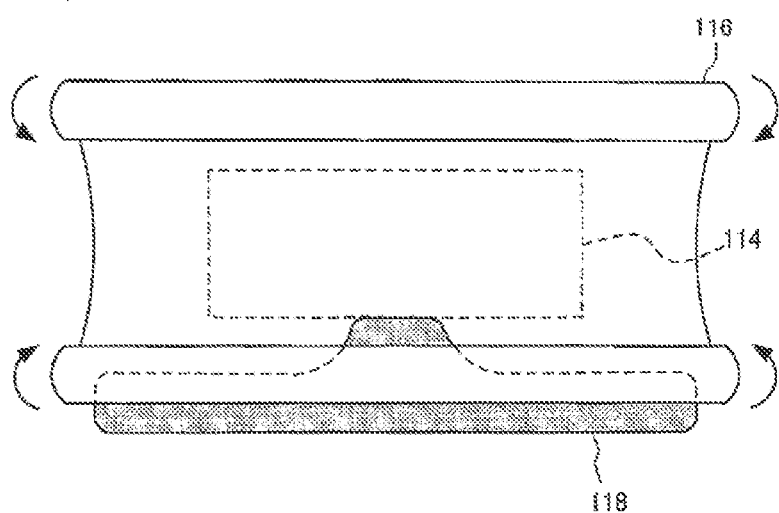
FIGS. 4(A) and 4(B) are views illustrating the process of assembling the knee airbag device according to the first embodiment.
Figure 4:
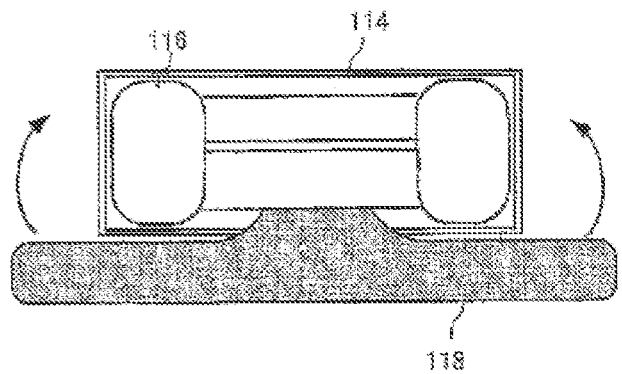

FIGS. 4(A) and 4(B) are views illustrating the process of assembling the knee airbag device 110 according to the first embodiment. The airbag 116 according to the present embodiment is initially wound or folded toward the center of the airbag 116 in the up-down direction (or front-rear direction), as shown in FIG. 4(A). Then, as shown in FIG. 4(B), the airbag is wound from the left and right or lateral ends toward the center of the airbag 116. In this case, when the airbag 116 accommodated inside the housing 114 is wound from the left and right sides, the airbag is not completely wound through the central portion. Rather, and the central portion is kept in an unwound state.

The lower portion of the folded airbag 116 is then enclosed with the restricting member 118. The state of the enclosed airbag 116 is shown in FIG. 3. When the airbag 116 is enclosed with the restricting member 118, one end of the restricting member 118 is fixed to the housing 114 and in this state the band-like portion of the restricting member 118 is folded toward the upper portion of the airbag 116 so as to cover the lower portion of the front surface of the airbag 116.

Both ends of the band-like portion of the restricting member 118 are inserted so as to be wrapped around the side surface toward the bottom or back surface of the airbag 116. In this case, as shown in FIG. 3(B), it is preferred that the end portions of the restricting member 118 be apart from each other, rather than in contact with each other, along the bottom surface of the airbag 116. The dimension D of the enwrapping portion of the restricting member 118 can be, for example, from 20 mm to about 70 mm. With such a configuration, no unnecessary restriction is placed on the deployment of the airbag 116. As a result, rapid deployment can be performed.

Figure 5:
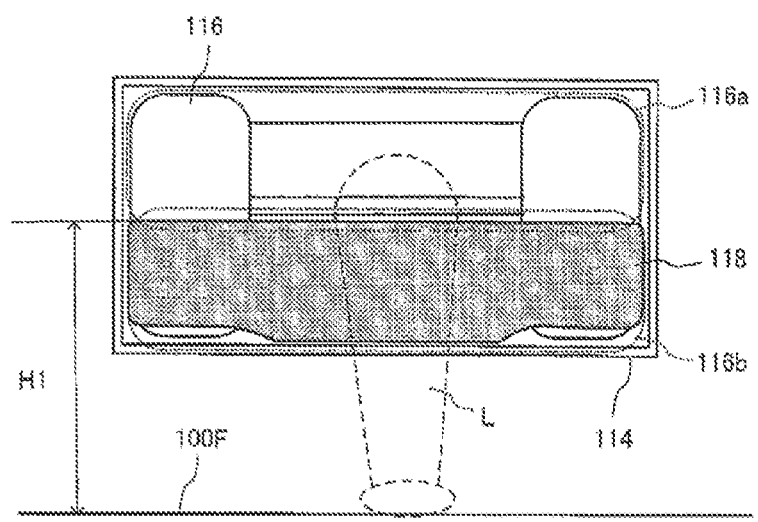
FIG. 5 is an explanatory drawing illustrating the arrangement of the knee airbag device according to the first embodiment.

FIG. 5 is an explanatory drawing illustrating the arrangement of the knee airbag device 110 according to the first embodiment and in relation to an occupant's lower leg portion L. In the present embodiment, the height H1 from a vehicle floor surface 100F should be set optimally so that the upper end portion or limit of the restricting member 118 is positioned close to the lower portions of kneecaps of the adult occupant in an irregular seating position. In the figure, the deployment non-restricted region (upper half) of the airbag 116 is encircled by the dotted line denoted by 116a and the deployment restricted region (lower half) is encircled by the dotted line denoted by 116b.

In the present embodiment, the deployment restriction of the airbag with the above-described restricting member 118 and the arrangement such as shown in FIG. 5 make it possible to reduce the application of excess pressure to the occupant.

Figure 6:
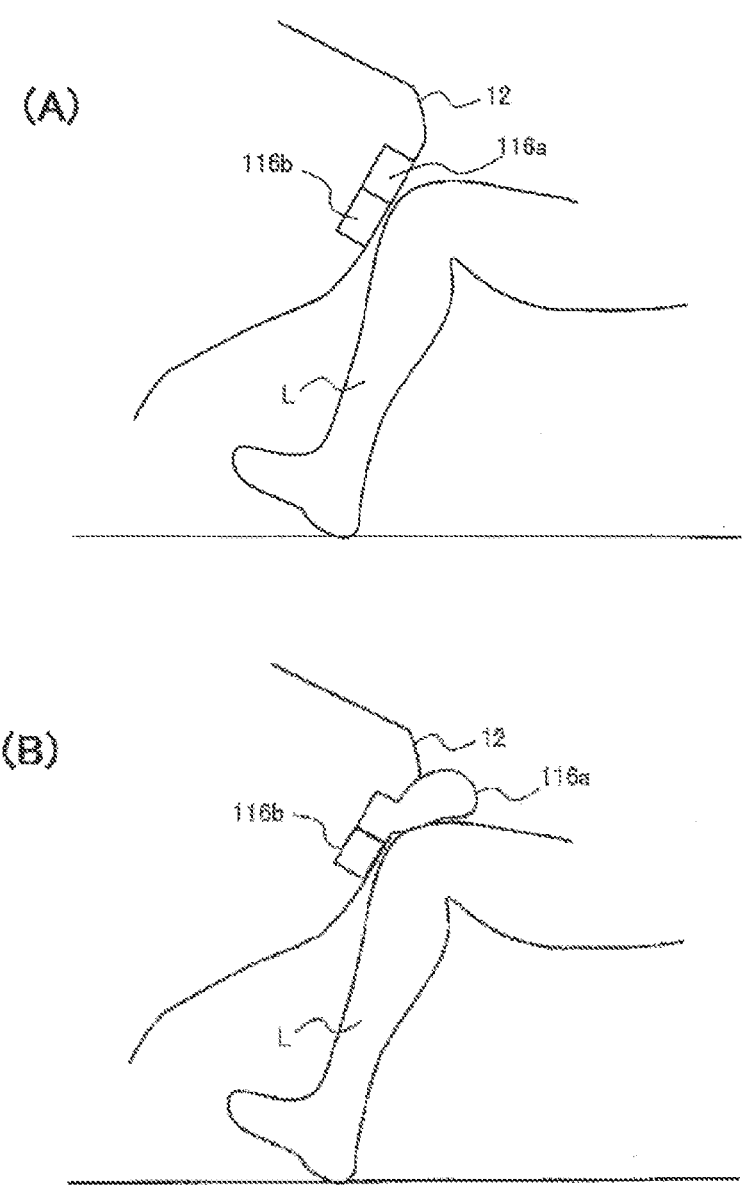
FIGS. 6(A) and (B) illustrates the operation of the knee airbag device in accordance with the present invention.

FIG. 6(A) shows a state in which a lower leg portion L of the occupant is generally in contact with the instrument panel 12. Where the airbag device 110 is actuated by front collision of the vehicle, or the like, the inflating gas is supplied from the inflator 112 into the airbag 116. The inflating gas starts the deployment of the airbag 116, but initially the upper portion, the deployment non-restricted region 116a, of the airbag 116 is deployed upward, as shown in FIG. 6(B), due to the action of the restricting member 118. Then, the lower portion, the deployment restricted region 116b, is deployed. Therefore, the deployed shape of the airbag 116 is long in the up-down direction and local application of a large pressure to the occupant can be avoided.

Figure 7:
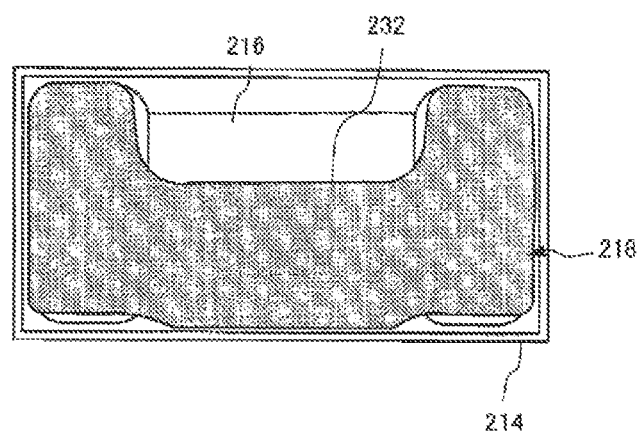
FIG. 7(A) is an elevational view illustrating the structure of a knee airbag device according to a second embodiment of the present invention and FIG. 7(B) is a view illustrating the structure of the deployment restricting member used therein.
Figure 7:
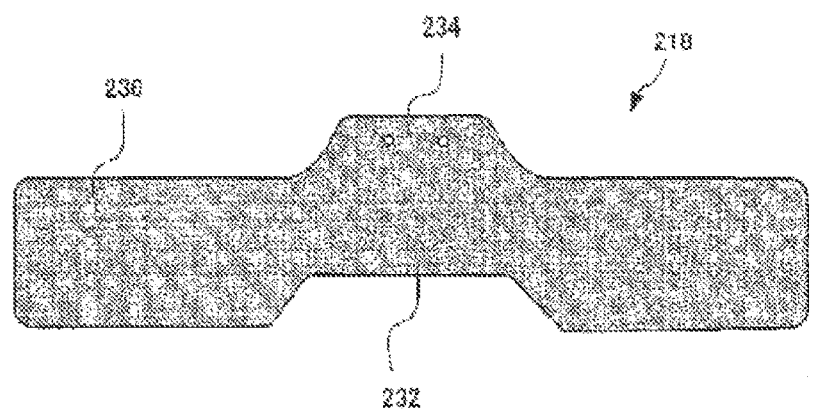

FIGS. 7(A) and 7(B) are an elevational view illustrating the structure of the knee airbag device according to the second embodiment of the present invention and a plan view illustrating the structure of the deployment restricting member 218 used therein. The knee airbag device according to the present embodiment differs from the knee airbag device 110 according to the above-described first embodiment in the shape of the deployment restricting member. Other constituent elements are the same and redundant explanation thereof is therefore omitted.

The deployment restricting member 218 according to the present embodiment is provided with a base portion 234 that is fixed to a housing 214, a recess 232 forming a deployment non-restricted region of an airbag 216, and left and right side portions 236 covering the side surfaces of the airbag 216. In the present embodiment, the entire roll portions positioned on the left and right sides of the folded airbag 216 are enclosed by the restricting member 218, while an upper center portion of the airbag 216 is not enclosed as a result of the recess 232. Where such a configuration is used, only the upper portion of the airbag 216 is initially deployed and thereafter the side and lower portions are deployed. Thus, in the present embodiment, the airbag 216 is preferentially deployed from the top portion in the center thereof.

Figure 8:
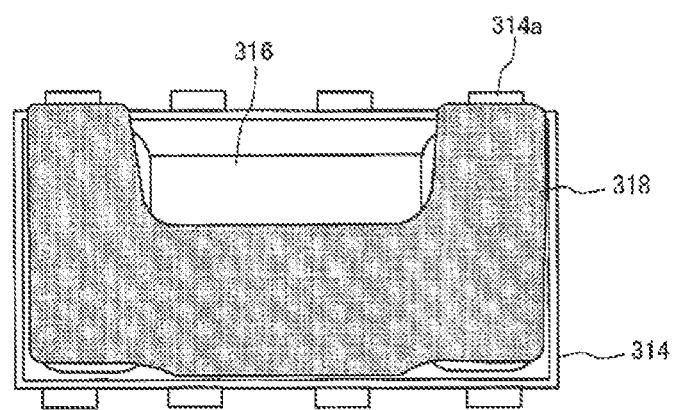
FIGS. 8(A) and 8(B) are an elevational view illustrating the structure of a knee airbag device according to a third embodiment of the present invention and a plan view illustrating the structure of the deployment restricting member used therein.
Figure 8:
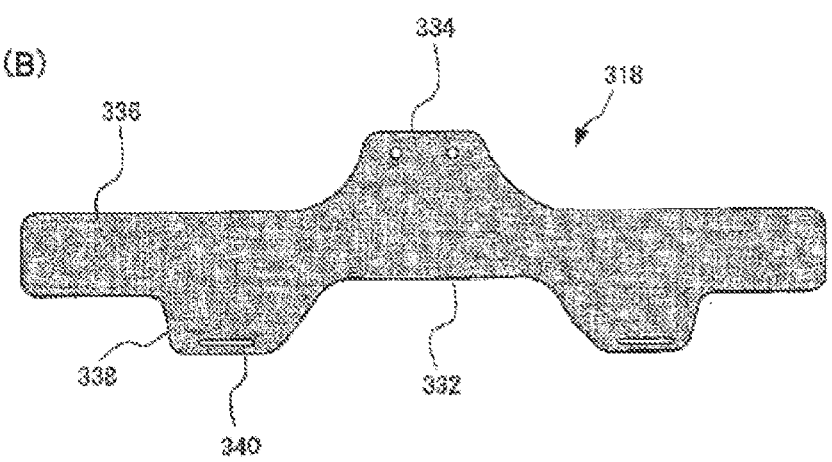
Figure 9:
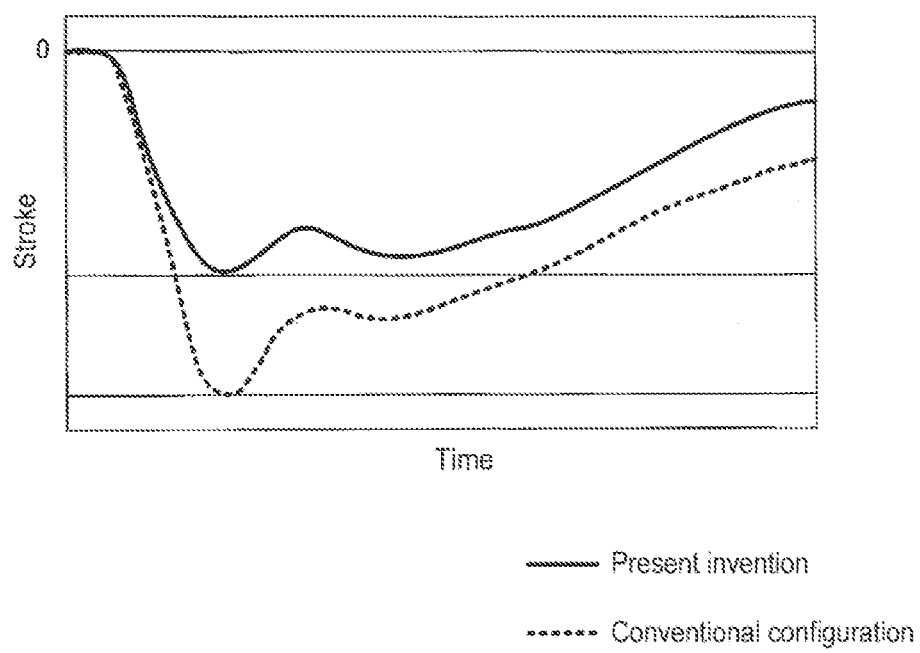
FIG. 9 is a graph illustrating the effect of the present invention.

FIGS. 8(A) and 8(B) are an elevational view illustrating the structure of the knee airbag device according to the third embodiment of the present invention and a plan view illustrating the structure of the deployment restricting member 318 used therein. The knee airbag device according to the present embodiment differs from the knee airbag devices according to the above-described first and second embodiments in the shape of the deployment restricting member 318. Other constituent elements are the same and redundant explanation thereof is therefore omitted.

The deployment restricting member 318 according to the present embodiment is provided with a base portion 334 that is fixed to a housing 314, a recess 332 forming a deployment non-restricted region of an airbag 316, and left and right side portions 336 covering the side surface of the airbag 316. The restricting member 318 is further provided with extension regions 338, between the recess 332 and the left and right side portions 336, that extend transverse to the side portions 336 and that are to be locked to hooks 314a of the housing 314. In the present embodiment, similarly to the above-described second embodiment, the roll portions positioned on the left and right sides of the folded airbag 316 are entirely enclosed by the side portions 336 and extension regions 338 of the deployment restricting member 318.

Locking holes 340 are formed at distal ends of the extension regions 338 of the restricting member 318, and these locking holes 340 engage with the hooks 314a of the housing 314. The locking holes 340 are provided so that they can be easily fractured when the airbag 316 is deployed.

Where the airbag device according to the present embodiment is actuated, only the center of the upper portion of the airbag 316 is initially deployed through the area defined by the recess 332, and thereafter the locking holes 340 are fractured and the restricted side portions and lower portion are deployed. Thus, in the present embodiment, the deployment of the airbag from the central upper portion can be said to be even more preferential than in the second embodiment.

The embodiments of the present invention are described above, but the present invention is not limited to the above-mentioned embodiments and various design changes can be made without departing from the technical concept of the invention described in the claims.

The invention claimed is:

1. An airbag device, comprising:
an airbag configured to protect, by inflation and deployment thereof, lower leg regions of an occupant of a vehicle;
a gas generator coupled to the airbag, the gas generator configured to supply an inflating gas to the inside of the airbag;
a housing receiving the airbag therein in a folded state; and
a deployment restricting member having one end thereof fixed to the housing, the deployment restricting member enclosing part of the folded airbag and thereby defining a deployment restricted portion, the portion of the airbag not enclosed by the deployment restricting portion defining a deployment non-restricted portion,
the airbag being configured to initially deploy upward from the deployment non-restricted portion with the deployment restricted portion being deployed after the deployment non-restricted portion,
the deployment non-restricted portion configured to be provided at a position corresponding to the vicinity of a lower portion of a kneecap of the occupant of the vehicle when the airbag is deployed, and
wherein the deployment restricted portion of the airbag, which is surrounded by the deployment restricting member, includes all lower portions of the airbag in the folded state including a lower portion of a top surface of the airbag and a lower portion of opposing left and right surfaces of the airbag.

2. The airbag device according to claim 1, wherein the airbag in a folded state is folded from left and right sides of the airbag toward a center of the airbag; and
the deployment restricting member encloses left and right side portions of the airbag in the folded state.

3. The airbag device according to claim 1, wherein
the deployment restricting member has side end portions on both sides thereof, the side end portions being located between the folded airbag and the housing; and
the side end portions on both sides of the deployment restricting member are spaced apart from each other when located between the folded airbag and the housing.

4. The airbag device of claim 1, wherein the deployment restricting member includes side ends on opposing sides thereof and a recess portion located between the side ends and defining the deployment non-restricted of the airbag.

5. The airbag device of claim 1, wherein the airbag in the folded state has a bottom surface adjacent to the housing, the top surface being opposite from the bottom surface, an upper surface, a lower surface opposite from the upper surface, and the opposing left and right surfaces, the deployment restricting member having portions extending over lower portions of the bottom surface, the top surface, the lower surface and the left and right surfaces.

6. The airbag device of claim 5, wherein the deployment restricting member includes a base portion, the base portion being located between the housing and the bottom surface of the airbag and extending from the bottom surface about the lower surface to the top surface of the folded airbag.

7. An airbag device, comprising:
an airbag configured to protect, by inflation and deployment thereof, lower leg regions of an occupant of a vehicle;
a gas generator coupled to the airbag, the gas generator configured to supply an inflating gas to the inside of the airbag;
a housing receiving the airbag therein in a folded state;
a deployment restricting member having one end thereof fixed to the housing, the deployment restricting member enclosing part of the folded airbag and thereby defining a deployment restricted portion, the portion of the airbag not enclosed by the deployment restricting portion defining a deployment non-restricted portion,
the airbag being configured to initially deploy upward from the deployment non-restricted portion with the deployment restricted portion being deployed after the deployment non-restricted portion,
the deployment non-restricted portion configured to be provided at a position corresponding to the vicinity of a lower portion of a kneecap of the occupant of the vehicle when the airbag is deployed, and
wherein the deployment restricting member has an extension region that is connected to an upper surface side of the housing.

8. The airbag device of claim 7, wherein the extension region includes locking holes formed therein, the locking holes engaging a portion of the housing.

9. The airbag device of claim 7, wherein the extension region is frangible generally upon completion of deployment of the deployment non-restricted portion.

10. The airbag device of claim 7, wherein the extension region extends transversely to side ends of the deployment restricting member.

11. An airbag device, comprising:
an airbag configured to protect, by inflation and deployment thereof, lower leg regions of an occupant of a vehicle;
a gas generator coupled to the airbag, the gas generator configured to supply an inflating gas to the inside of the airbag;
a housing receiving the airbag therein in a folded state; and
a deployment restricting member having one end thereof fixed to the housing, the deployment restricting member enclosing part of the folded airbag and thereby defining a deployment restricted portion, the portion of the airbag not enclosed by the deployment restricting portion defining a deployment non-restricted portion,
the airbag being configured to initially deploy upward from the deployment non-restricted portion with the deployment restricted portion being deployed after the deployment non-restricted portion, and
the deployment non-restricted portion configured to be provided at a position corresponding to the vicinity of a lower portion of a kneecap of the occupant of the vehicle when the airbag is deployed
the deployment restricting member includes side end portions on opposing sides thereof, a recess portion located between the side ends and defining the deployment non-restricted of the airbag, and a base portion located opposite of the recess portion, the base portion extending generally transversely to the side end portions.

12. An airbag device, comprising:
an airbag configured to protect, by inflation and deployment thereof, lower leg regions of an occupant of a vehicle;
a gas generator coupled to the airbag, the gas generator configured to supply an inflating gas to the inside of the airbag;
a housing receiving the airbag therein in a folded state; and
a deployment restricting member having one end thereof fixed to the housing, the deployment restricting member enclosing part of the folded airbag and thereby defining a deployment restricted portion, the portion of the airbag not enclosed by the deployment restricting portion defining a deployment non-restricted portion, the airbag being configured to initially deploy upward from the deployment non-restricted portion with the deployment restricted portion being deployed after the deployment non-restricted portion, and the deployment non-restricted portion configured to be provided at a position corresponding to the vicinity of a lower portion of a kneecap of the occupant of the vehicle when the airbag is deployed the deployment restricting member includes side end portions on opposing sides thereof, and a base portion located between the side end portions, the base portion extending generally transversely to the side end portions.

* * * * *